March 1, 1932.　　J. A. WINTROATH　　1,847,369
SELF ADJUSTING SHAFT BEARING

Filed July 30, 1925　　2 Sheets-Sheet 1

INVENTOR
JOHN A. WINTROATH
BY
Fred W. Lawie
ATTORNEY

March 1, 1932.  J. A. WINTROATH  1,847,369
SELF ADJUSTING SHAFT BEARING
Filed July 30, 1925   2 Sheets-Sheet 2

INVENTOR
JOHN A. WINTROATH
BY
ATTORNEY.

Patented Mar. 1, 1932

1,847,369

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

SELF ADJUSTING SHAFT BEARING

Application filed July 30, 1925. Serial No. 46,977.

My invention relates to a mechanically operated wear compensating bearing which may be depended upon to maintain itself in proper journaling relationship with a shaft. My invention is very valuable on vertical turbine irrigation pumps and I shall describe it as applied to this use.

A common vertical turbine irrigation pump has a pump head which is usually placed near the surface of the ground at the top of the well. A column pipe extends from the pump head to the lower end of the well where a pump section is attached thereto. The pump section includes a plurality of impeller sections having impeller chambers in which impellers are placed. Bearings are supported in each impeller section near the impellers, through which bearings a pump shaft extends. This pump shaft supports the impellers in the impeller chambers. The pump shaft is secured to a line shaft, which extends through the column pipe to the pump head, by means of which the impellers in the pump section are rotated. These pump bearings naturally wear since they are subjected to friction by the pump shaft which turns therein. Water obtained from the ground contains more or less abrasive particles such as sand which tend to get in between the pump bearings and the pump shaft, especially after the bearings or shaft wear slightly. The abrasive particles when in the bearings rapidly cut away both the bearings and the shaft. Any considerable wear permits a whipping of the pump shaft and causes the impellers to engage the walls of the impeller chamber with consequent rapid destruction of impellers and impeller chamber.

It is an object of my invention to provide a mechanical self-adjusting wear compensating bearing which will maintain itself at all times in accurate journaling relationship with a shaft. Such an arrangement excludes sand and thus prevents wear between the bearing and the shaft and prevents whipping of the shaft.

It is a further object of my invention to provide a bearing arrangement of this character in which the engagement between the bearing and the shaft will be the same regardless of the amount of wear of these parts.

Other objects and advantages of my invention will be made evident hereinafter.

Referring to the two sheets of drawings in which I illustrate a preferred form of my invention, Fig. 1 is a diagrammatic view showing a vertical turbine irrigation pump in which my invention may be used.

Figure 1:
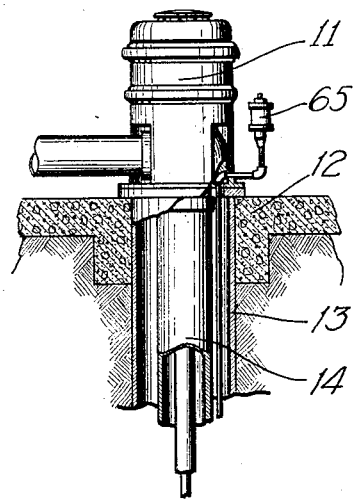
Figure 5:
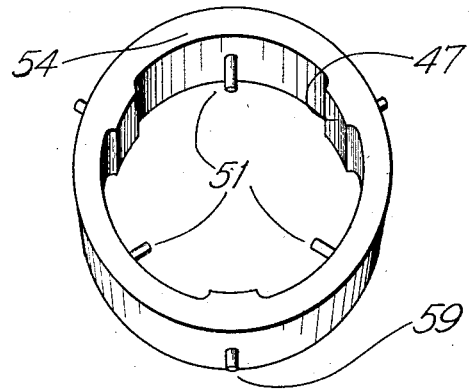
Fig. 5 is a perspective view of a constricting member of my invention.
Figure 5:
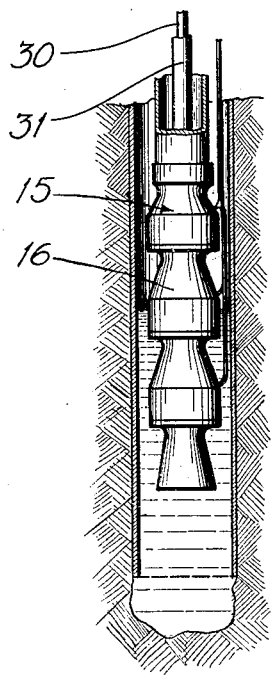
Figure 4:
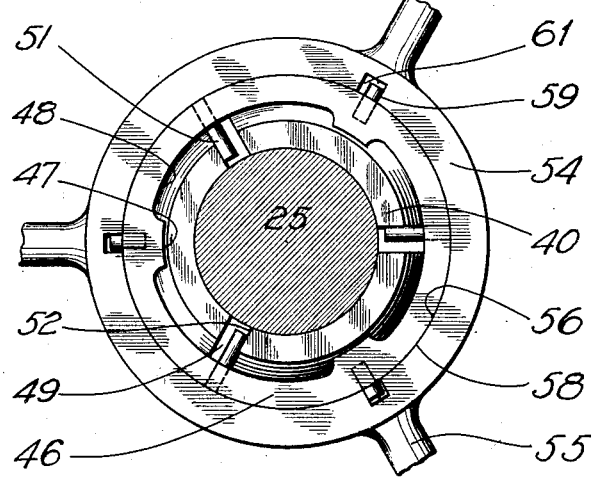
Fig. 4 is a section taken on the line 4—4 of Fig. 2.
Figure 2:
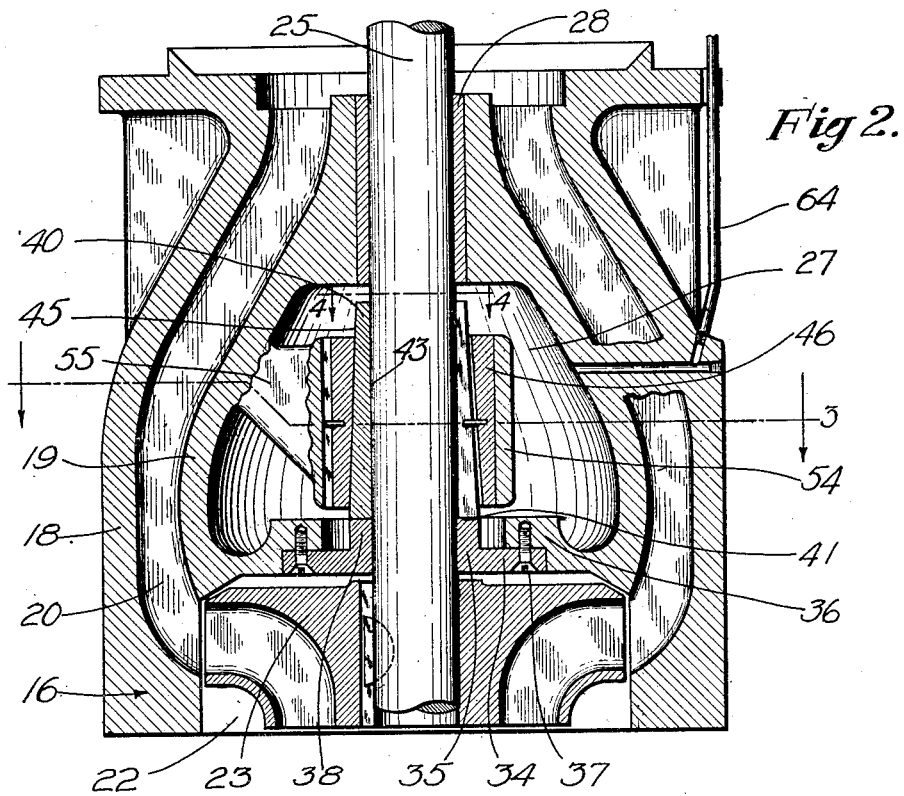
Fig. 2 is an enlarged vertical section through an impeller section of the pump shown in Fig. 1, this view clearly showing my invention.
Figure 3:
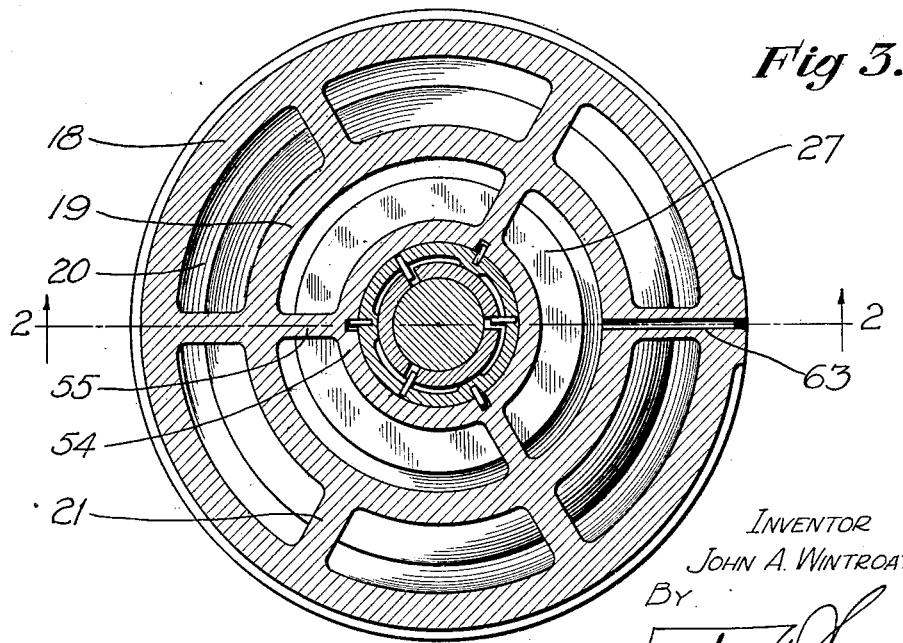
Fig. 3 is a section taken on the line 3—3 of Fig. 2.

With reference to Fig. 1, I show a pump head 11 which is situated on a foundation 12 at the upper end of a well 13. Extending from the pump head 11 to the lower part of the well 13 is a column pipe 14, to the lower end of which there is secured a pump section 15. The pump section 15 is composed of impeller sections 16, the construction of which is clearly shown in Figs. 2 and 3.

With reference to these figures, each of the impeller sections comprises an outer shell 18 and an inner shell 19 between which there is a water passage 20. Deflector vanes 21 extend between the outer and inner shells 18 and 19, these deflector vanes serving to guide the water in proper paths and also to support the inner shell 19 from the outer shell 18. An impeller chamber 22 is formed near the lower end of the impeller section 16 in which an impeller 23 secured to the shaft 25 is placed. The inner shell 19 provides a bearing chamber 27 and a bearing 28 which is situated at the upper part thereof. The pump shaft 25 extends through the chamber 27 through the bearing 28. The upper end of the pump shaft 25 connects to a line shaft 30 which extends upward through an oil tube 31 to the head 11.

A flange 34 of a bearing supporting member 35 is secured to an annular ledge 36, formed at the lower part of the bearing chamber 27, by screws 37. The bearing supporting member 35 has a cylindrical projection 38 which surrounds the pump shaft 25. My invention provides a bearing which is composed of a plurality of bearing segments 40, it being preferable to have three segments which rest on an upper face 41 of the cylindrical projection 38 of the bearing supporting member 35. As clearly shown in Fig. 2 inner faces 43 of the bearing segments 40 are cylindrical, engaging the pump shaft 25, and outer faces 45 of the bearing segments 40 are conical, being of smaller size at the upper ends thereof. Surrounding the bearing is a constricting member 46 which is of annular cross section. Engagement portions 47 which project inwardly from an inner cylindrical face 48 of the constricting member 46 engage the conical faces 45 of the bearing segments 40, these engagement portions 47 engaging the segments 40 centrally along their length. When bearing segments 40 are in working position, as shown in the drawings, axial spaces 49 exist therebetween. Pins 51 extend inwardly from the constricting member 46 and enter the spaces 49. These pins 51 engage end faces 52 of the segments 40 and prevent them from rotating with the pump shaft 25.

Surrounding the constricting member 46 is a cylindrical guide member 54, which in this embodiment of my invention is in the form of a hub which is supported in the bearing chamber 27 by legs 55 which extend from the inner shell 19. An inner cylindrical face 56 of the guide member 54 engages an outer cylindrical face 58 of the constricting member 46, thus retaining it in proper position. Pins 59 supported by the constricting member 46 extend into longitudinal slots 61 of the guide member 54 for restraining the constricting member 46 from rotation.

Lubricating oil is supplied to the bearing chamber 27 through a passage 63 which extends through the impeller section 16 and which connects with a vertical extending oil pipe 64, this oil pipe 64 extending upwardly through the well 13 and having an oil cup 65 attached at the upper end thereof.

The operation of my invention is substantially as follows: The driving mechanism of the pump head 11 rotates the line shaft 30, thus rotating the pump shaft 25 which is connected thereto. This pump shaft 25 journals in bearings 28 of the impeller section 16 and in the automatic wear compensating bearings of my invention. The impellers 23 force water through the pump section 15 and through the column pipe 14 to the surface of the ground. As the bearing segments 40 wear, they will be automatically moved inwardly by the constricting member 46 and are maintained at all times in proper journaling position. The weight of the constricting member 46 is applied to the bearing segments 40 by reason of the engagement between the engagement portions 47 of the constricting member 46 and the conical faces 45 of the segments 40, in such a manner as to force them inwardly at a uniform pressure. This pressure may be determined by the weight of the constricting member 46 and by the amount of taper of the conical faces 45 and the engagement portions 47. As wear takes place in the inner faces 43 of the bearing segments 40 and the shaft 25, the segments 40 are moved inwardly and the constricting member 46 will move downwardly. The bearing segments 40 are retained in their proper position by the bearing supporting member 35 on which they rest. Rotation of the constricting member 46 is prevented by co-engagement of the pins 59 and the slots 61, and rotation of the bearing segments 40 is prevented by engagement of the pins 51 with the sides 52 of the segments 40.

From the foregoing description and drawing it should be understood that the bearings of my invention operate automatically and maintain a proper journaling relationship between the segments 40 and the shaft 25. Such an arrangement as my invention greatly prevents an entrance of sand into the bearing, thus reducing its wear. A very important advantage of my invention is that the bearing is always in proper adjustment and there will not be a whipping of the pump shaft 25. As prevously mentioned, when a pump shaft whips, the outer parts of the impellers engage the walls of impeller chambers, thus wearing them away and providing spaces through which water may pass back below the impellers. This greatly reduces the efficiency of the pump and in many instances completely ruins the impellers and the impeller sections so that the pump is of no value. The bearing of my invention is simple in construction, having few parts. It is designed as is obvious from Figs. 2 to 5 inclusive, so that it may be readily installed in an impeller section.

I claim as my invention:

1. In a bearing structure capable of correctly journalling a vertical shaft at a point which is relatively inaccessible, the combination of: a guide member providing a vertical bore through which said shaft extends, said bore providing longitudinal slots therein; a plurality of segmental bearing members surrounding said shaft in journalling relation therewith and providing tapered exterior surfaces which converge in an upward direction; a constricting member vertically slidable in said bore, and acting by its own weight to move said segmental bearing segments into correct journalling engagement with said shaft, said constricting member providing an interior tapered to correspond to the taper on said segmental bearing segments; pins extending externally from said constricting member and into said longitudinal slots so as to slide therealong and prevent rotation of said constricting member in said bore; and means extending inwardly from said constricting member and fitting between each pair of said bearing members to prevent rotation thereof.

2. In a self-adjusting bearing for a vertical shaft, the combination of: a guide member providing a cylindrical bore into which said shaft extends; a bearing member in said bore and engaging said shaft; and a unitary constricting member around said shaft and freely movable in said bore in a vertical direction under the action of gravitational force to maintain said bearing member in journalling relationship with said shaft.

3. A combination as defined in claim 1 in which each of said segmental bearing members and said constricting member provides inter-engaging means acting centrally along a material portion of the length of said bearing members but not at the edges thereof.

In testimony whereof, I have hereunto set my hand at Los Angeles, California, this 24th day of July, 1925.

JOHN A. WINTROATH.